United States Patent [19]

Russell

[11] 4,161,027
[45] Jul. 10, 1979

[54] DIGITAL PROTECTION SYSTEM FOR TRANSMISSION LINES AND ASSOCIATED POWER EQUIPMENT

[75] Inventor: Billy D. Russell, Bryan, Tex.

[73] Assignee: Electric Power Research Institute, Inc., Palo Alto, Calif.

[21] Appl. No.: 729,558

[22] Filed: Oct. 4, 1976

[51] Int. Cl.² .................. G05B 9/02; H02H 7/00
[52] U.S. Cl. ........................... 364/492; 307/11; 340/163; 364/119; 364/200
[58] Field of Search ............. 235/151.21; 290/40 R; 340/172.5, 163; 445/1; 307/11, 17, 31, 52; 444/1; 364/101, 492–495, 200, 119

[56] References Cited

U.S. PATENT DOCUMENTS

| 3,839,629 | 10/1974 | Russell | 235/151.21 |
|---|---|---|---|
| 3,875,384 | 4/1975 | Davis | 364/492 |
| 3,892,975 | 7/1975 | Yannone et al. | 364/492 |
| 3,898,441 | 8/1975 | Davis et al. | 235/151.21 |
| 3,903,402 | 9/1975 | Petit et al. | 235/151.21 |
| 3,931,502 | 1/1976 | Kohlas | 364/492 |
| 3,972,470 | 8/1976 | Takagi | 235/151.21 |
| 3,984,737 | 10/1976 | Okamura et al. | 364/492 |
| 4,075,699 | 2/1978 | Schneider et al. | 364/492 |

Primary Examiner—Errol A. Krass
Attorney, Agent, or Firm—Townsend and Townsend

[57] ABSTRACT

A system including a number of subsystems having dedicated protection units which are dedicated to the protection of specific transmission lines and associated power equipment, each subsystem having stand-alone capability. The subsystems are interfaced to a central computer through a remote control communications interface unit. Each subsystem includes a microprocessor which interfaces with the corresponding transmission line or associated power equipment to be protected through converters, sensors, contacters, direct digital control equipment and the like. The central computer is capable of performing real time modification by addressing each subsystem to change local protection parameters thereof to fit system needs. The system is totally digital, lending itself to integration into other digital control apparatus.

13 Claims, 4 Drawing Figures

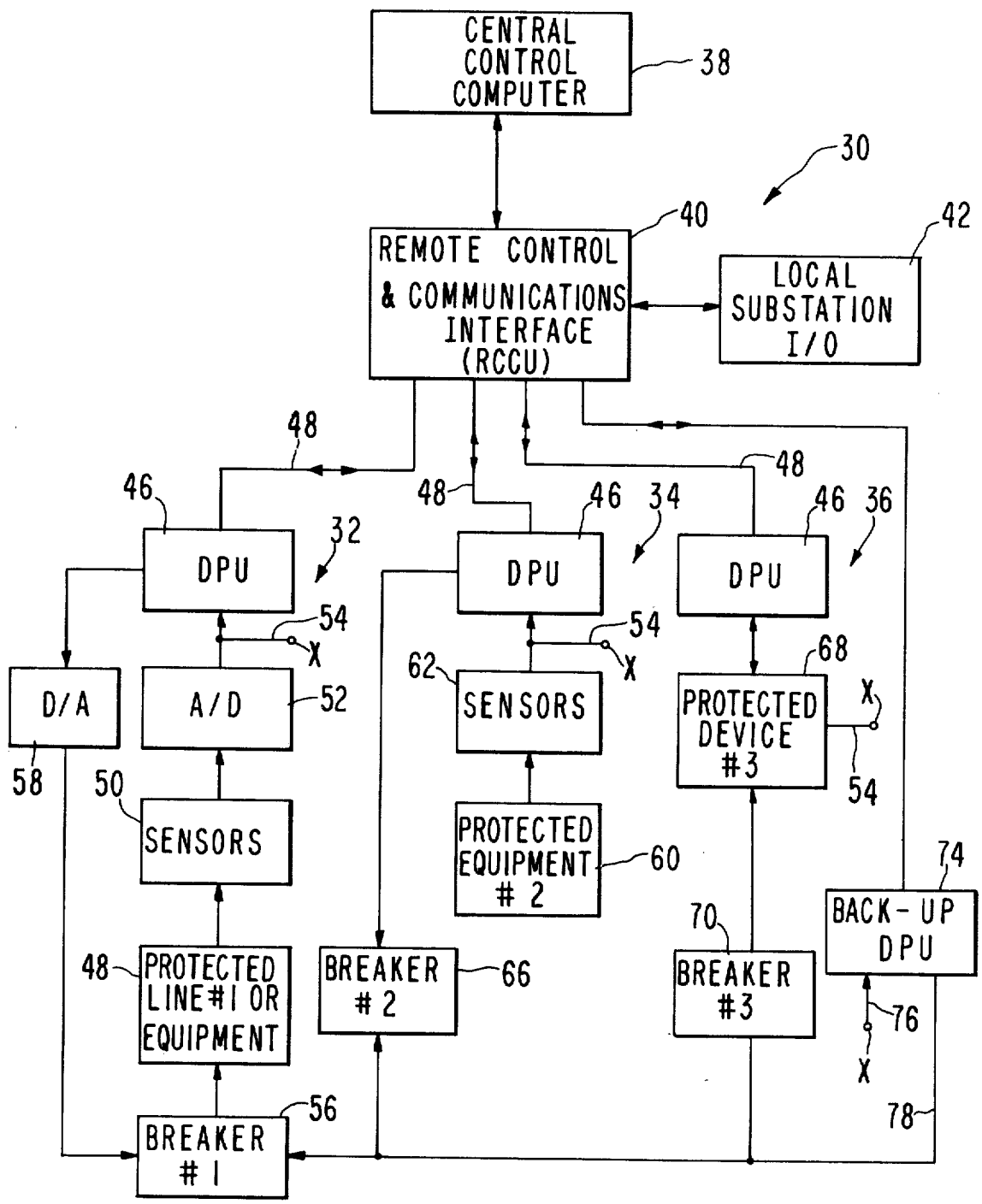

DIGITAL PROTECTION SYSTEM FOR TRANSMISSION LINES AND ASSOCIATED POWER EQUIPMENT

This invention was made under contract with or supported by the Electric Power Research Institute, Inc.

This invention relates to improvements in the protection of electrical power equipment, such as transmission lines, transformers and the like and, more particularly, to a digital protection system of extremely high reliability for protecting remotely located transmission lines and associated power equipment.

BACKGROUND OF THE INVENTION

Electrical transmission lines and power equipment used in heavy-duty power systems must be protected against fault conditions which could cause serious and expensive damage and personal injuries. Such a fault condition, for instance, might be a transmission line insulator failure which causes the transmission line to fall from an elevated position and to make contact with the ground. Line currents under such a condition can increase to several times the normal current and will destroy or damage both the lines and the attached equipment if the faulted line section is not cleared within a very short time after the fault condition occurs.

Conventionally, transmission lines are protected by electromechanical and electronic relaying systems which monitor the analog voltages and currents through the various lines through isolation transformers for the purpose of detecting out-of-tolerance operating conditions. Such systems process the line information in an analog format and achieve system reliability by having an independent protective relay dedicated to the protection of a single transmission line. This one-to-one correspondance between protection hardware and protected equipment, when considering the many transmission lines of a large system to be protected, yields the high reliability required by utilities but also results in relatively high equipment costs.

A major problem exists with conventional systems not in use. Modern remote control, automation and adaptive control techniques are being applied to power systems at all levels; however, currently used analog relay equipment cannot be conveniently interfaced with such systems. Settings and parameter modifications must generally be made by hand, rendering such analog systems useless for real time adaptive control. There have been no available digital relaying systems which can meet the strict reliability, security, and speed requirements of conventional systems, yet which offer a remotely adaptive capability.

Previous attempts at digital protective relay techniques have utilized single computer concepts wherein a medium-sized machine is used to monitor and protect transmission lines and related equipment. Such techniques have been described in the following references:

1. Rockefeller, G. D., "Fault Protection with a Digital Computer", Transmission IEEE, Vol. PAS-88, No. 4, April, 1969, pp. 438–61.
2. Phadke, A. G., M. Ibrahim, and T. Hlibka, "Computer in an EHV Substation: Programming Considerations and Operating Experience", American Electric Power Service Corporation.
3. Walker, Lewis, Steve Beottner and Granville Ott, "Software Considerations for Substation Computers", University of Missouri, Rolla.
4. Mann, B. J. and I. F. Morrison, "Relaying a Three Phase Transmission Line with a Digital Computer", IEEE Transactions, Vol. PAS-90, No. 2, March/April, 1971.

Systems of the type described in the above references have proven the feasibility of digital information processing techniques for protective relaying; however, they have not been totally acceptable from a security and reliability standpoint. Because of these limitations, such systems have never been used by utilities to perform line protection.

In view of the foregoing, a need presently exists for a digital relaying system which can meet the strict reliability, security and speed requirements of conventional systems, yet offer a remotely adaptive capability for increased line protection.

SUMMARY OF THE INVENTION

The present invention satisfies the aforesaid need by providing a digital relay system which incorporates microcomputer hardware for protective decision making and for the processing of subsystem information. The system is specifically adapted for this purpose for the following reasons:

1. The system has subsystems whose dedicated protection units have stand-alone capability and which are dedicated to the protection of a single line or piece of equipment.
2. The system processes all signals in a digital format.
3. Each system is system-integrated so that all protective settings and parameters can be remotely altered over communication links by either operators or by central computer control equipment.
4. The system has self-checking capability and back-up protection to provide maximum reliability.
5. The system can interface with and properly use the information supplied by modern high-voltage transducers with fiber optic data links.

With the foregoing characteristics, the system of the present invention has reliability which is superior to that of the conventional protection system. Moreover, the system can be used in adaptive control schemes, can be interfaced with existing advanced supervisory control equipment, and can be used to implement the more common protective schemes in use by utilities.

To achieve the foregoing aims, the system of the present invention utilizes a number of subsystems having dedicated protection units which interface through a remote control and communication interface unit with a central computer. Each subsystem is dedicated to the protection of a single transmission line and its related power equipment. Furthermore, each subsystem has a stand-alone capability which means that a loss of the central computer, data links, or the remote control and communication interface unit would, in no way, affect the effective protection of transmission lines of the various subsystems. Moreover, since each subsystem is dedicated to the protection of its single transmission line and its equipment, a failure of a subsystem would have minimal or substantially no effect on the overall protection scheme of the main system. Moreover, a back-up subsystem could be used to monitor sequentially all transmission lines for extreme overload conditions, thereby providing additional protection in the event that a subsystem charged with the protection of a transmission line should fail.

Each subsystem includes a microprocessor which interfaces with converters, sensors, contactors, direct digital control equipment and the like. The required configuration and capability of the microprocessor of each subsystem would be a function of the complexity of the protection task for the particular piece of equipment to which it is dedicated. Moreover, the microprocessor could be programmed with an appropriate fault detection algorithm and typically will have an external interrupt system which can interface signals from other substystems to develop integrated protection schemes.

Microcomputer equipment has, in practice, never been used in protective equipment for power transmission systems of any configuration. Also, the idea of dedicating a single subsystem of the type described with stand-alone capability is a new concept with respect to the protection of a single transmission line or related equipment while the subsystem is integrated into a large control system by way of communication links.

The primary object of this invention is, therefore to provide a digital protective system for remote electrical power transmission lines and related equipment wherein the system is totally digital, includes subsystems with stand-alone capability, and permits interfacing with a central computer to perform tasks not capable of being performed by conventional protective systems using relaying techniques.

Another object of the present invention is to provide a system of the type described which is highly reliable, provides safety measures and speed requirements of conventional systems, yet offers a remotely adaptive capability so that the system is suitable for use in applications required by municipal utility districts and the like and yet the system processes all signals in a digital format and its subsystems are system-integrated to assure that protective settings and parameters can be remotely altered over communication links for maximum versatility.

Other objects of this invention will become apparent as the following specification progresses, reference being had to the accompanying drawings for illustrations of the prior art and of the present invention. In the drawings:

FIG. 3 is a block diagram of the system of the present invention utilizing subsystems formed by microprocessors coupled directly to transmission lines or to related power equipment to be protected.

Figure 1:
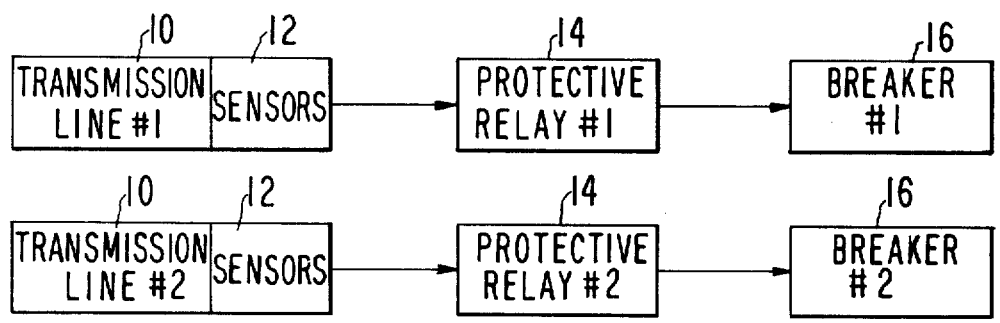
FIGS. 1 and 2 are block diagrams of transmission lines with protective systems of the prior art, showing relaying and digital techniques.
Figure 2:
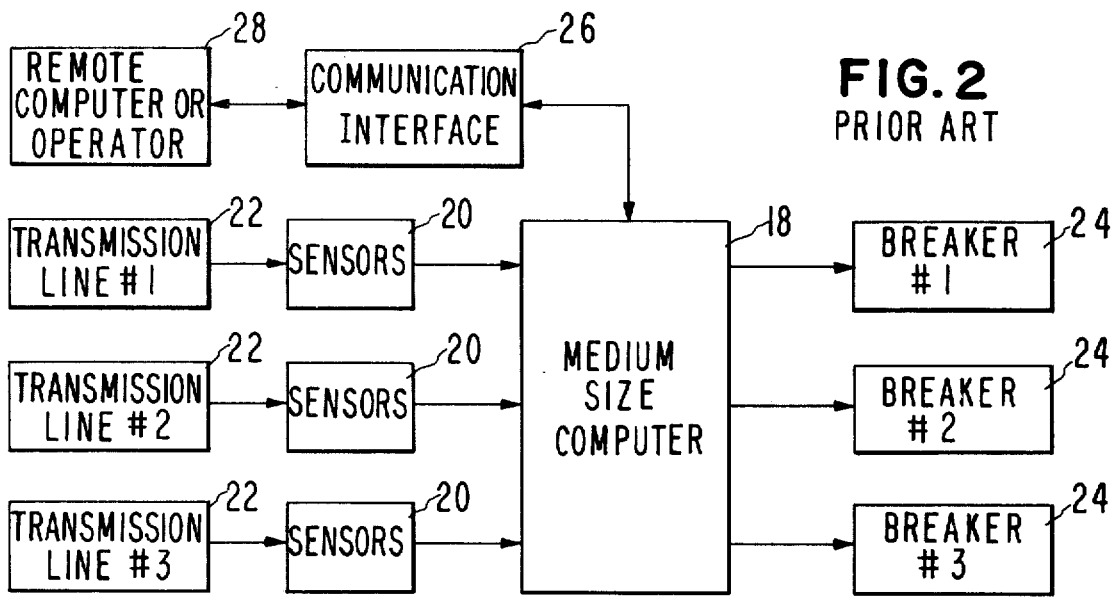

Conventional relaying techniques for transmission line protection have been proposed in the past with the use of apparatus of the type shown in FIGS. 1 and 2 but with little success. FIG. 1 shows transmission lines 10 provided with fault sensors 12 of any suitable construction, the output of the sensors being coupled to protective relays 14 which operate respective breakers 16. The relays, in effect, monitor analog voltages and currents and provide a one-to-one correspondence between the respective transmission lines and the breakers to yield a hih reliability.

FIG. 2 shows apparatus representing an attempt at digital protective relaying using single computer concepts wherein a medium-sized computer 18 has inputs for receiving analog voltages from sensors 20 of transmission lines 22 to be protected. Computer 18 controls breakers 24 associated with respective transmission lines 22, and the computer can interface through an interface unit 26 with a remote computer or operator 28. The FIG. 2 prior art structure establishes the feasibility of digital information processing for protective relaying, but such a system has not been totally acceptable from a security and reliability standpoint. Thus systems of this type have not generally been adopted for use by utilities.

The digital protection system of this invention is broadly denoted by the numeral 30 and is illustrated in FIG. 3. System 30 includes a group of subsystems 32, 34 and 36 which are generally remote from each other, have a stand-alone capability, and are interfaced to a central computer 38 by means of a remote control and communication interface unit 40. An input/output device 42 is coupled through interface unit 40 by data links to the various subsystems 32, 34 and 36.

Each subsystem has a dedicated protection unit 46 coupled by a data link 48 to interface unit 40. Each protection unit 46 is of the type shown in FIG. 4 and has a stand-alone capability. This means that a loss of the central computer, data links or interface unit 40 would in no way effect the effective protection of the corresponding transmission line or power equipment related to the line.

Each protection unit 46 interfaces with converters, sensors, contacters, direct digital control equipment or the like. For instance, subsystem 32 is dedicated to protecting a transmission line 48 or associated power equipment, and has one or more sensors 50 coupled thereto for sensing a fault condition on the line or in the equipment. The output of the sensor or sensors is directed to an A/D converter 52 coupled at its output to the input of the corresponding protection unit 46. A line 54 from an external interrupt device (not shown) is also coupled to the input of protection unit 46. A breaker 56 associated with subsystem 32 is coupled by a D/A converter 58 to protection unit 46, whereby the breaker causes the line or its associated equipment to be disabled in the event of a fault condition.

Subsystem 34 has equipment 60 to be protected, such as a transmission line or associated power equipment. One or more sensors 62 coupled to the equipment 60 is directed to the input of the corresponding protection unit 46, the latter also having an external interrupt line 54. A breaker 66 is also coupled with the protection unit 46 of subsystem 34 for the same purposes as breaker 56 of sybsystem 32. Similarly, for subsystem 36, its protection unit 46 is connected at its input to the protected device or equipment 68 and has a breaker 70 for the same purpose as breakers 56 and 66. An external interrupt line 54 is also provided for the subsystem.

A back-up dedicated protection unit 74 having an external interrupt line 76 is provided to sequentially monitor all lines for extreme overload conditions. Thus, protection unit 74 provides protection in the event that a primary protection unit 46 fails for any reason. Protection unit 74 is connected by a line 78 to the various breakers 56, 66 and 70 for this purpose. Such an operation would seldom be required since interface unit 40 checks each protection unit 46 on a regular basis for a failure condition and indicates a failure to central control computer 38.

The central computer interfaces with all protection units 46 as well as backup protection unit 74 through the various data links. The central computer also performs an additional control task of real time modification of the protection units by addressing each protection unit and changing local protection parameters to fit overall system needs and configurations.

Interface unit 40 manages the flow of data from each subsystem to the central computer and provides for limited pre-processing of information, distribution of central computer commands for protection scheme modifications, polling the distributive protection units for alarms and indications, and performs system integrity checks to insure reliable continuous operation of the entire system. A second interface unit 40 could be provided to yield a high degree of communications reliability for the system, if desired.

Interface unit 40 and protection units 46 and 74 are constructed of standard microcomputer systems and differ primarily in size rather than in processing capability. Required configuration and capability of each protection unit will be a function of the complexity of the protection task for the particular line or power equipment to which it is dedicated. The requirements for interface unit 40 are basically controlled by the type and amount of data handling required by the various subsystems.

Figure 4:
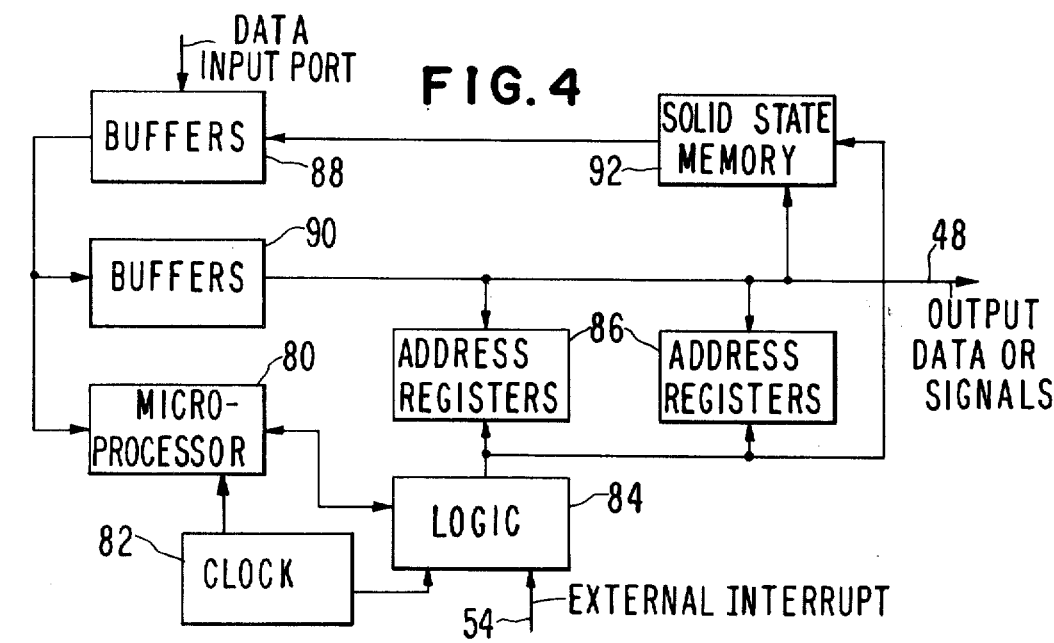
FIG. 4 is a block diagram of a protection unit incorporating a microprocessor, used with each of the subsystems of the system shown in FIG. 3.

Each protection unit 46 is of the type shown in FIG. 4 and includes a standard microprocessor 80 having a clock 82, the necessary logic 84 and address registers 86 coupled in the manner shown in FIG. 4 to the microprocessor, and buffers 88 and 90, the input of buffer 88 being the input from the corresponding sensors. A RAM/ROM memory 92 is also coupled to buffer 88 and to address registers 86. The data output is directed along data link 48 to interface unit 40. Microprocessor 80 will be programmed with an appropriate fault detection algorithm. Many such algorithms exist, and are well known to those skilled in the art. A suitable algorithm is described in McInnes and Morrison, "Real Time Calculation of Resistance and Reactance For Transmission Line Protection By Digital Computer", IEEE Transactions, Australian Institute of Engineers, EE-7, Pgs. 16–23 (1971).

Microprocessor 80 is coupled to an external interrupt means by external interrupt line 54. The external interrupt means may be associated with other subsystems, in which case the subsystems are able to communicate with one another. This provides an integrated protection plan in which the ability of the subsystems to communicate with each other allows a single fault condition to result in the control and protection of power equipment associated with several subsystems.

In operation, the subsystems at various substations remote from each other will be placed in operation for sensing fault conditions on respective transmission lines and related power equipment. At any time, the central computer can perform real time modifications by addressing each subsystem and changing local parameters, all of which can be accomplished to fit specific system needs or requirements. During operation of the system, interface unit 40 will process information flowing through it from the subsystems to the central computer and will also distribute commands from the central computer to the various subsystems. Interface unit 40 will also poll the various sybsystems for alarms or indications of faults and will further perform integrity checks of the system to insure substantially continuous operation of the system in a reliable manner.

If a fault occurs, falut infomation will be sensed by the various sensors and fed to the corresponding protection unit which will generate commands for operating appropriate breakers for disabling the faulting or overloaded line or equipment, thereby protecting the system and preventing serious and expensive damage. Signals are also generated which are directed to the control computer which issues commands to modify the protection parameters in response to the fault and breaker action, thereby optimizing the protection system for operation without the faulted line or equipment.

I claim:

1. A method of monitoring and controlling the respective operating conditions of a plurality of electrical power transmission structures at a corresponding plurality of locations remote from each other comprising: sensing the operating condition of the power transmission structure at each of the locations; digitizing the information corresponding to the sensed operating condition from each location; communicating the digitized information to a microprocessing station at each location; processing the digitized information with a predetermined algorithm to cause the generation of signals corresponding to the operating condition of the corresponding power transmission structure; communicating the signals from each microprocessing station to a central processing region independently of the communication of the signals from the microprocessing stations of the other locations; and changing the operating conditions of the transmission structure at a location corresponding to a predetermined operating condition detected by the receipt of digitized information at the corresponding microprocessing station.

2. A method as set forth in claim 1, wherein is included the step of directing commands from said central processing region to exactly one microprocessing station.

3. A method as set forth in claim 1, wherein said changing step includes interrupting the operation of a power transmission structure in response to a fault condition thereof.

4. A method as set forth in claim 1, wherein said changing step includes modification of protection parameters and transmission structure in response to changes in the operation or configuration of the structure or a fault in the structure.

5. A method as set forth in claim 1, wherein said changing step includes causing said microprocessing station to immediately interrupt the operation of the corresponding power transmission structure in response to a fault condition thereof and before the microprocessing station communicates with the central processing region.

6. A system for protecting a plurality of electrical power transmission structures, said structures being at locations remote from each other, each said structure having an actual operating condition and a defined range of operating conditions wherein protection is required when the actual operating condition is within the defined range, the system comprising: a plurality of subsystems, each said subsystem being operatively coupled to a respective power transmission structure for monitoring and controlling the operating condition thereof, each said subsystem includiing a digital information processor having an input and an output, sensor means operatively coupled to said structure for generating an electrical signal respresentative of the actual operating condition of said structure, means for transmitting said electrical signal to said input, said information processor having means for generating a control signal at said output when the actual operating condition is within said defined range, and means operatively coupling said output to the structure for changing the actual operating condition of the structure in response to said control signal; a central computer remote from at least one said subsystem; and means operatively coupling said central computer to said digital information processor for providing an interface therebetween such that data is communicated between said central computer and said digital information processor for communication with each said digital information processor independently of the other subsystems; wherein each of said subsystems carries out its functions independent of said central computer and said interface means, whereby said structures remain protected in spite of a failure of said central computer or said interface means.

7. A system as set forth in claim 6 wherein a first or said subsystems includes means for generating an interrupt signal, and wherein a second of said subsystems includes means operatively connected to said interrupt signal generating means for receiving the interrupt signal, such that the information processor of the first subsystem communicate with the information processor of the second subsystem to permit the development of an integrated protection plan.

8. A system as set forth in claim 6 wherein the digital information processor of a first of said subsystems includes means for generating electrical signals representative of the acutal operating condition of the power transmission structure of said first subsystem, wherein said central computer has means responsive to said first operating condition signal generating means for generating an electrical supervisory signal, and wherein the digital information processor of a second of said subsystems includes means responsive to said supervisory signal generating means for changing the defined range of operating conditions of the power transmission structure of said second subsystem.

9. A system as set forth in claim 6, wherein said means for changing the operating condition includes a breaker; and including a back-up information processor coupled to said interface means to monitor the operation of the power transmission structures of said subsystems and to actuate the breakers of the subsystems when respective structures experience overload operating conditions.

10. A system as set forth in claim 6, wherein each information processor includes a microprocessor programmable with a fault detection algorithm, and a memory for storage of data signals transmitted to the information processor from the corresponding sensor means.

11. A system as set forth in claim 6, wherein said interface providing means includes a microprocessor for controlling the flow of data to said central computer from each subsystem, and for distributing computer commands to the subsystems.

12. A system as set forth in claim 6 wherein at least one of the subsystems' sensor means generates an analog signal and wherein the corresponding transmitting means includes an analog-to-digital converter for receiving analog signals from the corresponding sensor means and transmitting the signals in digital form to the input of the corresponding information processor.

13. A system as set forth in claim 12, wherein said one subsystem has a digital-to-analog converter coupled between the corresponding information processor and the corresponding changing means to provide an analog signal to the latter in response to a digital signal from the information processor.

* * * * *